United States Patent [19]

Stillinger

[11] Patent Number: 5,029,704
[45] Date of Patent: Jul. 9, 1991

[54] CORD KEEPER

[76] Inventor: Scott H. Stillinger, 16121 Azalea Way, Los Gatos, Calif. 95030

[21] Appl. No.: 505,415

[22] Filed: Apr. 6, 1990

[51] Int. Cl.⁵ .......................................... B65D 85/04
[52] U.S. Cl. .................................... 206/329; 174/135; 206/334; 206/408; 220/339
[58] Field of Search ...................... 174/135; 206/45.15, 206/49, 328, 329, 331, 332, 334, 389, 397, 408, 409, 45.13; 220/339

[56] References Cited

U.S. PATENT DOCUMENTS

| 244,519 | 7/1881 | Back | 206/45.15 |
|---|---|---|---|
| 528,935 | 11/1894 | Galland | 206/45.15 |
| 2,160,961 | 6/1939 | Dorman . | |
| 2,351,379 | 6/1944 | Wehringer | 174/135 |
| 2,364,262 | 12/1944 | Wehringer . | |
| 2,449,464 | 9/1948 | Eypper | 174/135 |
| 2,501,270 | 3/1950 | Fleming | 206/45.13 |
| 2,582,787 | 1/1952 | Martin | 206/328 |
| 2,587,707 | 3/1952 | Dever . | |
| 2,763,707 | 9/1956 | Soderberg | 206/328 |
| 3,068,316 | 12/1962 | Witt . | |
| 3,089,210 | 5/1963 | Ritter . | |
| 3,567,013 | 3/1971 | Lannenbaum | 220/339 |
| 3,580,650 | 5/1971 | Morris | 220/339 |
| 3,924,819 | 12/1975 | Lapinskas . | |
| 4,123,012 | 10/1978 | Houghes . | |
| 4,177,961 | 12/1979 | Gruenewald . | |
| 4,511,037 | 4/1985 | Lucous | 206/397 |
| 4,582,196 | 4/1986 | Hughson et al. | 206/49 |

FOREIGN PATENT DOCUMENTS

| 0110574 | 5/1940 | Australia | 206/389 |
|---|---|---|---|
| 2432469 | 2/1980 | France . | |

Primary Examiner—Jimmy G. Foster
Attorney, Agent, or Firm—Kolisch, Hartwell, Dickinson, McCormack & Heuser

[57] ABSTRACT

A keeper for taking up and storing excess length (slack) in an elongate cord and the like, such as an electrical cord. The keeper disclosed is formed as a unitary, molded, bi-fold device including a pair of housing parts that swing between open and latch-closed conditions, which parts cooperate with a hinged cord-winder panel that swings into a central plane between the two housing parts with the latter closed to define a pair of cord-wind-storing compartments. In its closed and operative condition, the keeper presents, to the viewer's eye, an elongate, slender, graceful element extending in the line of remaining portions of cord.

9 Claims, 2 Drawing Sheets 5,029,704

CORD KEEPER

BACKGROUND AND SUMMARY OF THE INVENTION

This invention relates to a keeper for receiving and storing excess length (slack) in an elongate cord and the like, such as an electrical lamp cord. More particularly, it relates to such a device which is characterized by low cost, simple, sleek design, and convenience and ease of use.

Familiar to most people is the sight of draping, twisting, often-in-the-way, excess lengths of electrical cord which extend between an electrical appliance, such as a lamp, and an outlet. In the past, various devices having many different designs have been proposed for enabling the user to take up and, in some fashion, store excess line, or cord, length.

The present invention, according to a primary objective, is focused on providing a unique, easy to use, unitary-construction, aesthetically pleasing device which offers a novel construction to deal with the slack problem.

According to a preferred embodiment of the invention, proposed is an elongate, generally linear, multi-component keeper which is formed unitarily, as by molding, employing a suitable homogeneous material, such as a suitable plastic material. The proposed keeper includes a pair of hinged housing parts to which there is also hinged a swing-out cord-winder panel. Winds of excess cord are easily wrapped in elongate runs on this panel, and the same is then swung into a position centrally between the housing parts, which are then closed upon one another to latch (catch) in a condition fully concealing the taken-up winds. In its operative condition holding excess line, the keeper presents a simple, graceful, elongate, slender configuration to the outside world.

The proposed keeper is extremely easy to use in that, with all of its components joined as a unit, the keeper can be held in one hand, with the other hand used to place winds on the winder panel.

Various other objects and advantages that are attained by the invention will become more fully apparent as the description which now follows is read in conjunction with the accompanying drawings.

DETAILED DESCRIPTION OF THE INVENTION

Figure 1:
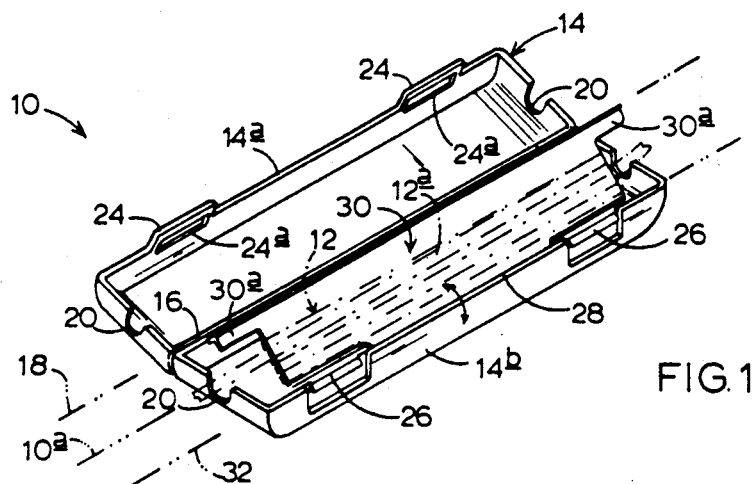
FIG. 1 is a perspective view of the keeper of the invention shown in a partially open condition, with taken-up, ready-to-be-stored, winds of excess electrical cord shown in phantom lines.
Figure 2:
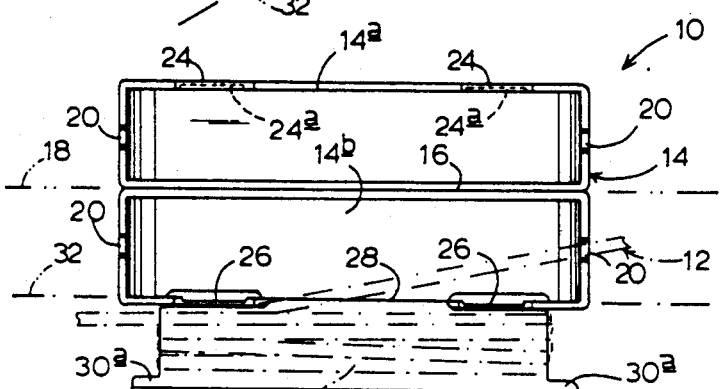
FIG. 2 is a plan view of the keeper of FIG. 1 illustrated in a fully open condition, again with taken-up winds shown in phantom lines.
Figure 3:
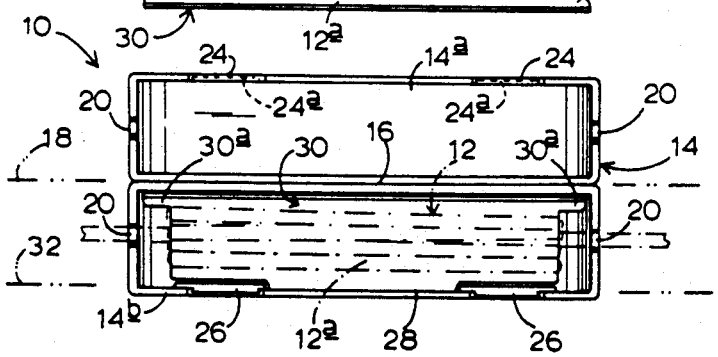
FIG. 3 is a plan view, similar to that of FIG. 2, with the exception that a cord-winder panel in the keeper, holding taken-up winds (phantom lines), has been folded into a ready-to-be-stored condition relative to one of the housing components in the keeper.
Figure 4:
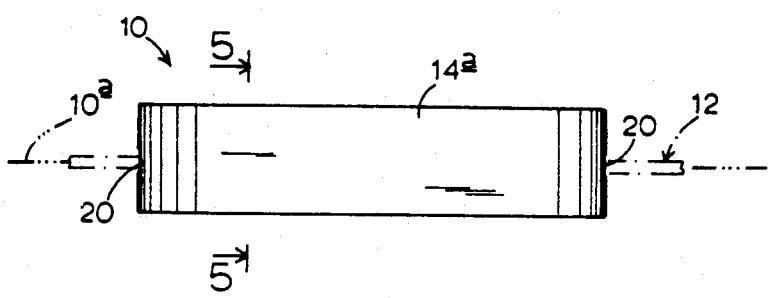
FIG. 4 is another plan view of the keeper of FIGS. 1, 2 and 3, showing the same in a fully closed condition, with cord (phantom lines) shown extending from ports provided adjacent opposite ends of the keeper.
Figure 5:
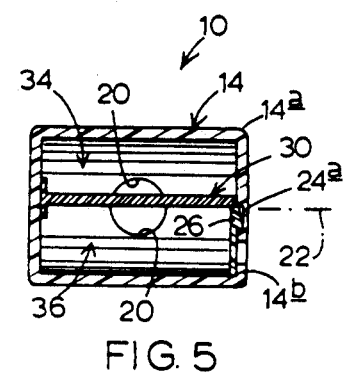
FIG. 5 is an enlarged-scale cross-sectional view taken generally along line 5—5 in FIG. 4, rotated 90°, showing the relative positions of components in the keeper of the invention with the keeper in its closed condition.

Turning now to the drawings, and referring initially to FIGS. 1–5, inclusive, indicated generally at 10 is a preferred embodiment of a keeper made in accordance with the invention for selectively storing excess length in an elongate cord and the like, such as an electrical cord. Such a cord is shown generally in phantom lines at 12. Keeper 10 has a sleek, elongate, generally linear configuration, with a long axis shown at 10a (FIGS. 1 and 4). The keeper is preferably formed as a unitary structure from a homogeneous molded plastic material, such as polypropylene.

Keeper 10 includes a housing structure 14 including a pair of housing parts 14a, 14b, which are joined through what is known as a living hinge 16. The respective shapes of parts 14a and 14b are believed to be self-evident in the drawing illustrations.

Structure 14 is also referred to herein, variously, as lateral capture structure, as container means, and as a container. The housing parts are also referred to herein as container components.

Hinge 16 allows parts 14a, 14b to be swung relative to one another about an axis 18 between a fully open condition (FIG. 2) and a fully closed condition (FIG. 4).

Formed in the opposite ends of each of the two housing parts are notches 20 which cooperate, with the housing structure in its closed condition, to form what are referred to herein as endo-disposed cord exit ports (see particularly FIG. 4). With the housing parts closed upon one another, the same are thought of herein as closing on opposite sides of a plane of closure 22 (see FIG. 5).

Formed along the elongate edge of housing part 14a, which edge is opposite hinge 16, are two slightly extending ears 24 which include elongate catch recesses 24a. Formed along the elongate edge of housing part 14b which is opposite hinge 16 are two outwardly projecting catch lugs 26 which are adapted to cooperate with recesses 24a to snap-latch, or catch, with the housing parts folded to close the housing structure (FIG. 4).

Completing a description of the structure shown in FIGS. 1–5, inclusive, joined through a living hinge 28 to the edge of housing part 14b which is opposite hinge 16, hinge 28 being located between lugs 26, is an elongate cord-winder panel component 30, also referred to herein as a wind storer, and as means for receiving and holding winds. Hinge 28 provides a hinge axis 32. As can be seen, the overall length of this panel is somewhat less than the matching overall lengths of housing parts 14a, 14b, with the elongate edge of panel 30 which is opposite hinge 28 terminating with projecting fingers 30a.

Explaining how the device thus far described is used, the same as placed in its fully opened condition (FIG. 2), and held in one hand of the user. The user then wraps elongate winds of excess cord, such as those shown generally in phantom lines at 12a, onto the exposed winder panel, between housing part 14b and fingers 30a. With a suitable number of winds thus wrapped in place, the winder panel is swung about axis 32 provided by hinge 28 to place it, relative to housing part 14b, in what will become closure plane 22 (see FIGS. 3 and 5). The user, still holding the device in one hand, then places oppositely extending lengths of the cord through notches 20 in part 14b. and thereafter swings housing part 14a into the fully closed condition, with notches 24a and lugs 26 engaging to lock the device in the closed condition. As can be seen especially in FIG. 5, with all of the constituents forming keeper 10 in the condition just described, panel 30, in essence, divides the interior of the housing structure into two line-length-containing enclosures, or compartments, shown at 34, 36, with these compartments being located on opposite sides of the centrally located winder panel.

The keeper, because of the two folding axes provided, namely axes 18,32, is referred to herein as a bi-fold device. Its simplicity, convenience and ease of use, as well as its sleek outward presentation, should be clearly evident.

Figure 6:
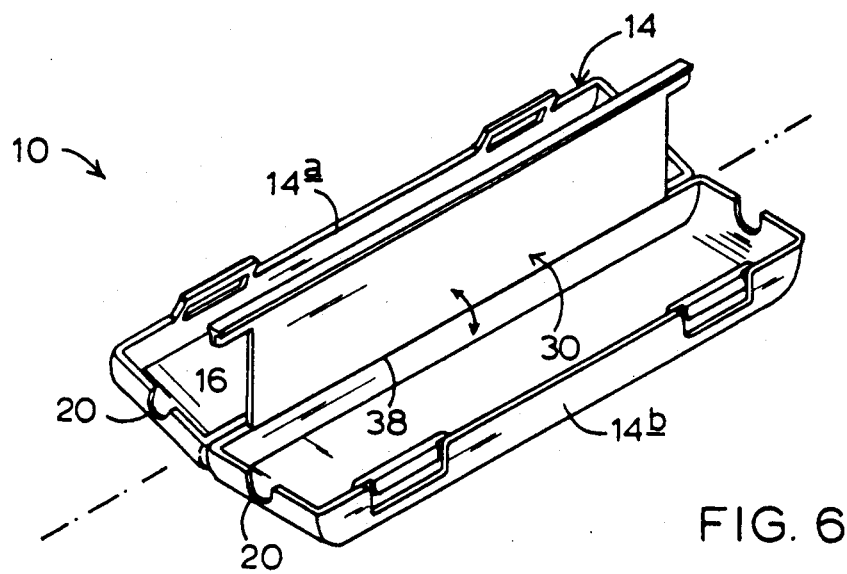
FIG. 6 is a view like that presented in FIG. 1 showing a first modified form of a keeper made in accordance with the invention (cord winds not shown).
Figure 7:
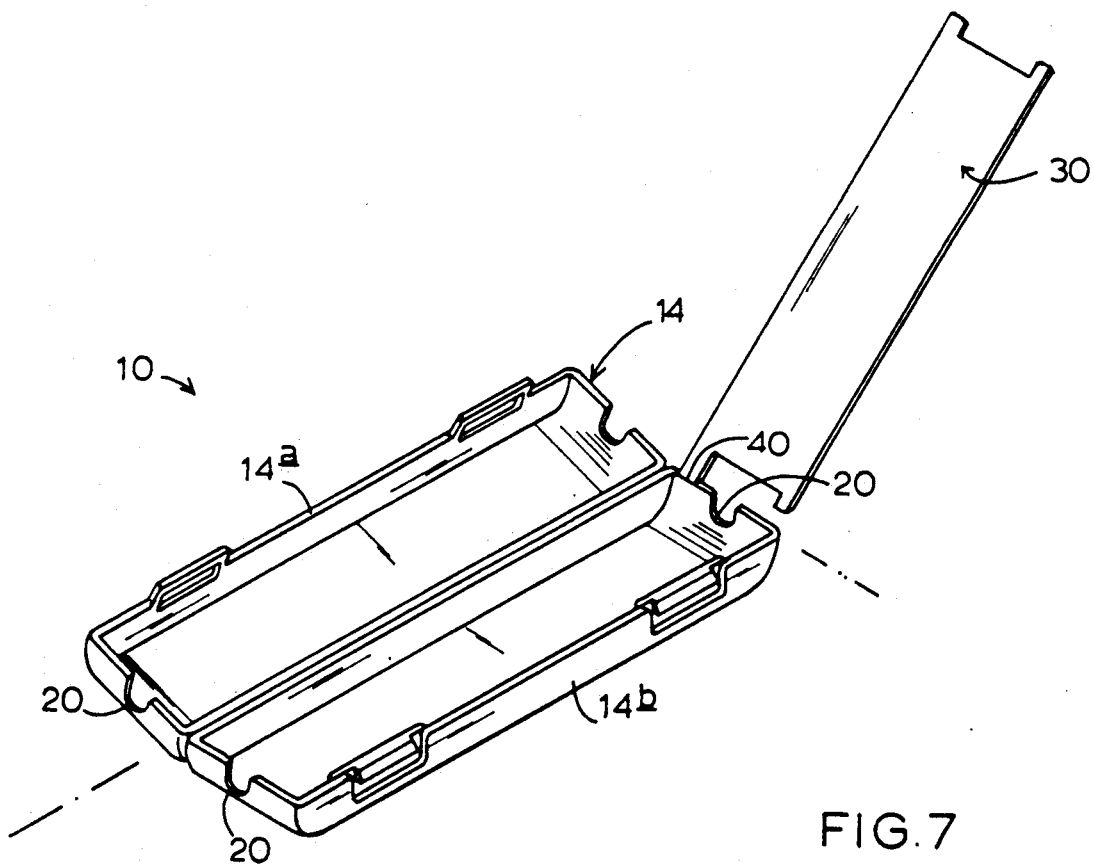
FIG. 7 is also a view like that presented in FIG. 1, here showing a second proposed modification of the keeper of the invention (cord winds not shown).

Modifications of the structure just described which contain all of the features and which offer all of the same advantages, are recognized to exist, and two of these are illustrated, respectively, in FIGS. 6 and 7. In these two drawing figures, components which are substantially the same as like components described with respect to FIGS. 1-5, inclusive, bear the same reference characters.

Turning attention to FIG. 6, here the key difference is that winder panel 30 is joined through a living hinge 38 centrally in the structure to previously described living hinge 16.

In FIG. 7, the principal difference is that the winder panel, having the somewhat varied perimetral outline shown, is joined through a living hinge 40 to one end of housing part 14b on one side of a notch 20.

It should be evident how the modified forms of the keeper, shown in FIGS. 6 and 7, may be used.

Accordingly, a preferred embodiment, and two recognized modifications, have been described herein of an excess-length cord keeper made in accordance with the invention, which keeper uniquely and conveniently addresses the problems and concerns expressed earlier. Other variations and modifications may of course be made without departing from spirit of the invention.

I claim:

1. A keeper for excess length in a run of cord, such as electrical cord, and the like, comprising
    means for defining an elongate, generally linear, selectively openable/closeable hinged container including opposite, endo-disposed, cord-access ports, and
    planar panel means operatively associated with said container for receiving and holding therewithin elongate winds of such a length directly hinged to said container along one edge of the panel means.

2. A keeper for excess length in a run of cord, such as electrical cord, and the like, comprising
    means defining an elongate, generally linear, selectively openable/closeable hinged container including opposite, endo-disposed, cord-access ports, and
    planar panel means operatively associated with said container for receiving and holding therewithin elongate winds of such a length directly hinged to said container along one edge of the panel means, wherein the construction is such that hinging action takes place along a pair of generally parallel axes.

3. An elongate keeper for storing excess length in an elongate cord-like material comprising
    housing structure including a pair of hinged-together parts swingable relative to one another between reversible open and catch-closed conditions, said parts being hinged together adjacent a pair of adjacent edges for swinging about one axis, said housing structure further including a pair of cord exit ports formed in said parts adjacent opposite ends of the structure, and
    a cord-winder component hinged to said housing structure adjacent an edge of one only of said parts, which latter edge is remote from said one axis, for swinging of the winder component relative to said one only part about another axis, which generally parallels said one axis, between an exposed condition with the housing parts in their open condition, and an enclosed condition within said structure between said housing parts with the latter in their closed condition, to form, along with said parts, a pair of enclosed compartments said two axes generally paralleling the long axis of the keeper,
    said component, when exposed, being adapted freely to receive winds of such a cord, and when enclosed, to hold such received winds snugly within said compartments.

4. A keeper for storing excess length in an elongate cord-like material comprising
    housing structure including a pair of hinged-together housing parts swingable relative to one another between reversible open and catch-closed conditions and including a pair of cord exit ports formed in said parts on a pair of opposite sides in said structure, and
    a cord-winder component hinged to said housing structure for swinging between an exposed condition with the housing parts in their open condition, and an enclosed condition within said structure between said housing parts with the latter in their closed condition to form, with said parts, a pair of enclosed compartments,
    said component, when exposed, being adapted freely to receive winds of such a cord, and when enclosed, to hold such received winds snugly within said compartments.

5. The keeper of claim 4, wherein said winder component is hinged to said structure adjacent an edge of at least one of said parts.

6. The keeper of claim 4, wherein said winder component is hinged to said structure adjacent an edge of one only of said parts.

7. The keeper of claim 1, wherein said parts are hinged together adjacent a pair of adjacent edges for swinging about one axis, and said winder component is hinged to said structure adjacent an edge of one only of said parrs, which latter edge is remote from said one axis, for swinging of the winder component relative to said one only part about another axis which generally parallels said one axis.

8. The keeper of claims 4, 5, 6 or 7 which has an elongate, compact, generally linear configuration.

9. The keeper of claim 8 wherein said structure and component are formed as a unitary, substantially homogeneous construction.

* * * * *